No. 611,567. Patented Sept. 27, 1898.
W. R. DIEHL.
TRANSPORTING APPARATUS.
(Application filed May 19, 1898.)
(No Model.) 2 Sheets—Sheet 1.
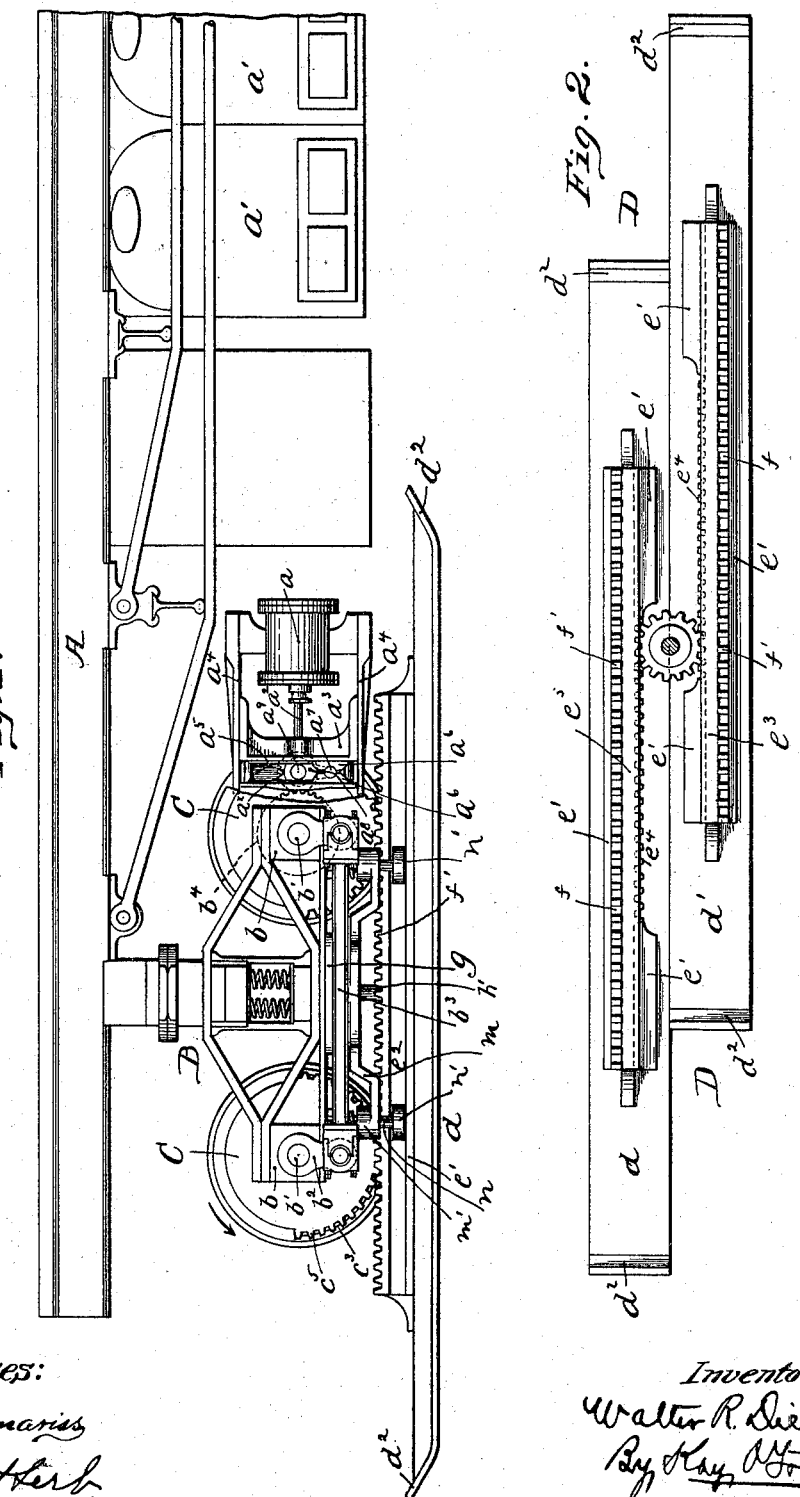

UNITED STATES PATENT OFFICE.

WALTER R. DIEHL, OF PITTSBURG, PENNSYLVANIA, ASSIGNOR OF ONE-HALF TO WALTER LYON, OF ALLEGHENY, PENNSYLVANIA.

TRANSPORTING APPARATUS.

SPECIFICATION forming part of Letters Patent No. 611,567, dated September 27, 1898.

Application filed May 19, 1898. Serial No. 681,131. (No model.)

*To all whom it may concern:*

Be it known that I, WALTER R. DIEHL, a resident of Pittsburg, in the county of Allegheny and State of Pennylvania, have invented a new and useful Improvement in Transporting Apparatus; and I do hereby declare the following to be a full, clear, and exact description thereof.

My invention relates to apparatus for the transporting of heavy objects, such as cannon, steam-shovels, shipyard and other heavy service, &c.

The purpose of my invention is to provide a means for such transportation of heavy objects without the necessity of laying a track; and it consists in certain new and novel features of construction, which will be more fully hereinafter described.

Figure 3:
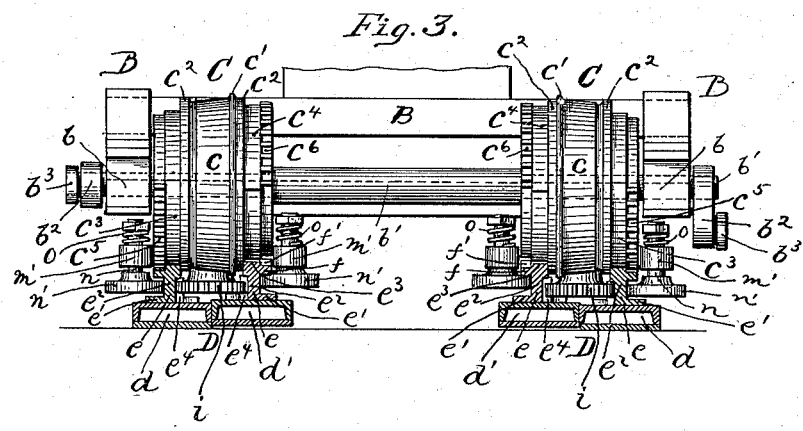
Figure 4:
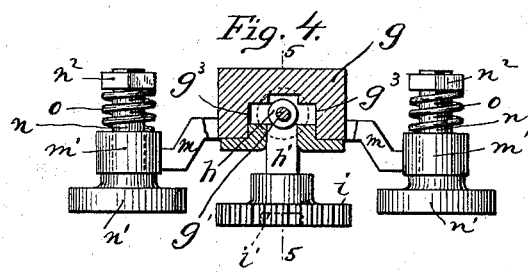
Figure 5:
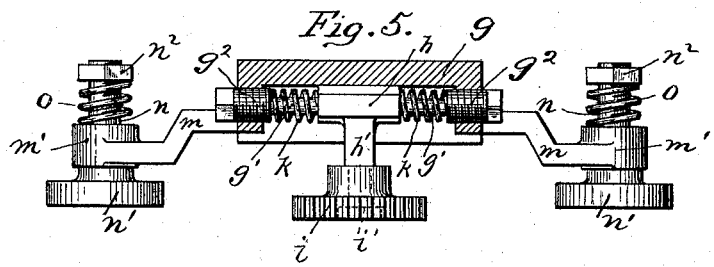

In the drawings, Figure 1 is a side view of a portion of any suitable car or vehicle with my invention applied thereto. Fig. 2 is a plan view of one of the movable skids carrying the track. Fig. 3 is a face view of the car, the skids being shown in section. Fig. 4 is a detail, partly in section, of the skid-operating mechanism; and Fig. 5 is a section on line 5 5, Fig. 4.

Like letters of reference indicate like parts in each view.

The letter A designates any suitable car-body mounted upon the trucks B, (only one of which is shown in the drawings.) The trucks B carry the boxes $b$, said boxes being connected to the trucks in the ordinary manner. Mounted to revolve in the boxes $b$ are the car-axles $b'$, upon which are keyed or otherwise secured the wheels C. The wheels C are rigidly secured to the axles $b'$, so that said wheels and axles will revolve together. The wheels C are of a novel construction, which will be more fully hereinafter described. Keyed or otherwise secured to the outer ends of the shafts or axles $b'$ are the cranks $b^2$, said cranks being connected together by means of the connecting-rods $b^3$. These connecting-rods are two in number for each truck, being upon opposite sides of the same, and are connected at a quarter to each other, so that the power will be constant from one axle to the other. The power may be applied to the wheels from any suitable motor or engine, and I do not wish to be considered as limiting myself in any manner to the construction shown. The construction shown in the drawings consists of the two cylinders $a$, (only one of which is illustrated,) coupled at a quarter, which are connected to the boilers $a'$ in any suitable manner, said connection not being shown on the drawings. The piston-rod $a^2$ is attached to a piston within the cylinder, said rod being connected to the cross-head $a^3$, working in suitable guides $a^4$. A guideway $a^5$ is formed in the cross-head $a^3$ for the blocks $a^6$. A crank-pin $a^7$ upon the crank $a^8$ is journaled in the blocks $a^6$, said crank being keyed to a shaft $a^9$, upon which is keyed the pinion $a^\times$. The shaft $a^9$ is suitably mounted in suitable bearings, said bearings, however, not being shown.

The pinion $a^\times$ meshes into the gear-wheel $b^4$, which is keyed to one of the axles $b'$, and motion is thus imparted to revolve the axle $b'$ and likewise the wheels C, which are secured thereto. The wheels C are preferably formed with a central face or tread $c$ and flange $c'$. This central face or tread and flange is for the purpose of transporting the car upon tracks when desired, as would be quite advantageous at times in moving it from place to place where a regular line of railway could be utilized. Outside of the face or tread portion $c$ and inside the flange $c'$ are the flanges $c^2$, and next to these are the two half-treads $c^3$ and $c^4$, respectively. In the position shown in the drawings, Fig. 3, the half-tread $c^3$ is down, while the half-tread $c^4$ is up, or, more properly speaking, they are diametrically opposite to each other. In practice I find it convenient to have these treads slightly more than half the circumference of the wheel—that is to say, they slightly overlap each other. This is for a purpose which will be more fully hereinafter described.

Outside the aforementioned half or segmental treads $c^3$ and $c^4$ are the semicircular cogs or segmental racks $c^5$ and $c^6$. The cogs or racks $c^5$ correspond substantially in point of circumferential measurement and position to the tread $c^3$, and in the same way the cogs $c^6$ correspond substantially to the tread $c^4$. The diameter of pitch-line of said cogs $c^5$ and $c^6$ is equal to the diameter of treads $c^3$ and $c^4$, all of said diameters being equal to each other.

Beneath the aforementioned wheels C are the movable track-sections D. These track-sections D consist of the two skids $d$ and $d'$, which are held close together and parallel in a manner more fully described hereinafter and, as shown in Fig. 1, have upturned ends $d^2$. These track-sections are preferably formed only of sufficient length necessary for the use of one truck or set of wheels. This allows the turning of the trucks at an angle to the course of the car, as will be more fully described hereinafter. Secured upon the upper surface of the skids $d$ and $d'$ are the rail-sections $e$. The skids $d$ and $d'$ are preferably made longer than the rail-sections $e$, so as to give a greater bearing-surface to uphold the weight of the car and its load. Each rail-section $e$ is formed with the flanges $e'$, web $e^2$, and tread $e^3$. Secured to or formed integral with the web $e^2$ are the rack-teeth $e^4$, formed upon the inner faces of said web. Flanges $f$ project out from the outside of the rails, near the upper part thereof, said flanges having the teeth $f'$ formed upon their upper faces, the pitch-line of the teeth $f'$ being in the same plane as the upper face of the rail-tread $e^3$. The segmental treads $c^3$ $c^4$ ride alternately upon the rail-treads $e^3$ $e^3$, while the segmental teeth $c^5$ $c^6$ alternately engage their respective racks $f'$. The flanges $c^2$ extend down inside the rails $e$ and aid in holding the wheels from side movement upon said rails.

Secured upon the lower face of the trucks B are the guide-boxes $g$, said boxes being best shown in Figs. 4 and 5. A rod $g'$ extends longitudinally of the box $g$, being held in place by the adjustable plugs $g^2$. Mounted to reciprocate upon the rod $g'$ and in the guideways $g^3$ of guide-box $g$ is the cross-head $h$, said cross-head having the arm or stud $h'$ depending therefrom. A gear-wheel $i$ is journaled upon the lower end of the arm or stud $h'$, being held in place by means of the nut $i'$. Heavy coil-springs K surround the rod $g'$, said springs being interposed between the cross-head $h$ and plugs $g^2$.

The tension upon the springs K may be varied by turning the plugs $g^2$, said plugs being threaded into their seats in the box $g$. Extending out from the four corners of the box $g$ are the four arms $m$, at the outer ends of which are formed the guides $m'$. Stems $n$ are fitted into said guides $m'$, being free to revolve or slide therein. The rollers $n'$ are rigidly secured to the lower ends of the stems $n$, the upper ends of said stems being threaded to receive a nut $n^2$, and a stout coil-spring $o$ surrounds the stem $n$, being interposed between the guide $m'$ and the nut $n^2$. The rollers $n'$ bear against the outside of the webs $e^2$ of the rails $e$ and tend to keep the skids close together. When the weight of the car or vehicle has been removed from either of the skids $d$ or $d'$, the springs $o$, through the stems $n$ and rollers $n'$, act to lift said skid $d$ or $d'$, the rollers $n'$ taking hold of the rail $e$ beneath the flange $f$.

The pinion $i$ meshes into the racks $e^4$ upon both the rails $e$ at one and the same time. I do not wish to limit myself in any sense to the exact construction described and illustrated, as that may be varied without affecting the scope of my invention.

The operation of my invention is as follows: Supposing the parts to be in the positions shown in Figs. 1 and 3, power is applied through the engine $a$ to operate the wheels of the truck B. The centers of half-treads $c^3$ are resting upon the rails $e$, and their corresponding toothed segments $c^6$ are in mesh with the teeth of rack $f'$. The loose rails $e$ and their skids $d'$ have been raised by means of the springs $o$, acting through the stems $n$ and rollers $n'$. It will therefore be noticed in Fig. 3 that the weight of the car is upon the outer skids $d$ of the rail-supports and that the inner skids are raised free from the ground and are free to move. It will also be noticed from Fig. 1 that the skids $d$ and $d'$ are side by side point for point. This is due to the fact that the half-treads $c^3$ have their center points resting upon the rails $e$—that is to say, that the treads $c^3$ have revolved one-half of their circumferential length. As the wheel proceeds to revolve in the direction of arrow, Fig. 1, the treads $c^3$ will continue to run upon the rail $e$ with the segmental teeth $c^5$ in mesh with the teeth of rack $f'$, and as the car moves forward the teeth of gear-wheel $i$, meshing into the teeth of rack $e^4$, said gear-wheel is revolved, and as the teeth of the gear-wheel $i$ are also in mesh with the teeth of rack $e^4$ upon the rail $e$ of the skid $d'$ said skid $d'$ will be propelled forward thereby, being thus propelled by the forward movement of the truck as well as by the rotation of the gear-wheel $i$. The gear-wheel $i$ advances the free skid or track-section to the exact position to allow the intermeshing of the segmental rack $c^5$ with its fellow on the corresponding track-section, which is about to sustain the supporting-wheels C. The racks are for the purpose of making it impossible for the wheels to slip. It will be seen that this movement will propel the loose skid $d'$ forward until it moves ahead of the car and in position for the treads $c^4$ to bear upon it and take the weight of the car off from the skid $d$, when the skid $d'$ will be raised by means of the springs O, so that it will be first brought up even with the skid $d'$ during the first quarter of the revolution of the wheels and during the next quarter-revolution will be propelled ahead in a similar manner to that previously explained in connection with the skid $d'$.

As previously explained, the treads $c^3$ and $c^4$ extend slightly farther than one-half the circumference of the wheel or that they somewhat overlap each other. This is for the purpose of preventing any jar or jolt that might come upon the car when the wheel is changing its bearing from one rail to the other. If this were not so constructed, the wheels and track might be injured when said change is being made. On account of this overlapping of the segments there will be a time when the weight of the car will come upon both skids and neither will be free to move, holding the gear-wheel $i$ and its stud or arm $h'$ stationary. At the same time, however, the car is going forward and the cross-head will ride backward upon the rod $g'$, compressing one of the springs $k$. As soon as the further revolution of the wheels allows the parts to pass over this point the whole weight of the car will again come upon one skid, leaving the other free to move, when the spring $k$ will force the cross-head $h$, carrying stud or arm $h'$ and wheel $i$ back to their normal positions and making up for the lost motion due to this temporary holding down of both skids.

It will be seen by the above description that the motion is practically a stepping or walking motion, enabling a heavy article to be propelled forward step by step over soft or yielding ground without the aid of a permanent track and overcoming the necessity of laying same. It will also be seen that if the truck B were turned at an angle to its course the skids would be turned also, and the course of the car might thus be varied.

Having now fully described my invention, what I claim, and desire to secure by Letters Patent, is—

1. In transporting apparatus, wheels for supporting the object to be transported, longitudinally-movable track-sections, means for supporting and driving said wheels on one set of said track-sections, and mechanism for advancing the other set, alternately, substantially as set forth.

2. In transporting apparatus, wheels for supporting the object to be transported, longitudinally-movable track-sections, means for supporting and driving said wheels on one set of said track-sections, and mechanism for elevating and advancing the other set, alternately, substantially as set forth.

3. In transporting apparatus, wheels for supporting the object to be transported, longitudinally - movable track - sections, said wheels having segmental treads at opposite portions of their peripheries adapted to engage with said track-sections, alternately, and mechanism for driving said wheels and advancing the track-sections not engaged by said treads, substantially as set forth.

4. In transporting apparatus, wheels for supporting the object to be transported, longitudinally - movable track - sections, said wheels having segmental treads at opposite portions of their peripheries adapted to engage with said track - sections, alternately, said track - sections having rack-faces thereon, a horizontal gear - wheel depending from the truck, said gear-wheel meshing with said rack-faces, and mechanism for driving said first-mentioned wheels, substantially as set forth.

5. In transporting apparatus, wheels for supporting the object to be transported, longitudinally - movable track - sections, said wheels having segmental treads and cogs at opposite portions of their peripheries adapted to engage with said track-sections, alternately, said track-sections having rack-faces thereon engaged by said cogs, a longitudinally - movable bearing, a horizontal gear-wheel depending from said bearing, said gear-wheel meshing with corresponding rack-faces on said track-sections, and mechanism for driving said first-mentioned wheels, substantially as set forth.

6. In transporting apparatus, wheels for supporting the object to be transported, longitudinally - movable track - sections, said wheels having segmental treads and cogs at opposite portions of their peripheries adapted to engage with said track-sections, alternately, said track-sections having rack-faces thereon engaged by said cogs, a rod supported by the truck, a sliding sleeve on said rod, springs interposed between the ends of said sleeve and the support for said rod, a horizontal gear-wheel depending from said sleeve, said gear-wheel meshing with corresponding rack-faces on said track-sections, and mechanism for driving said first-mentioned wheels, substantially as set forth.

7. In transporting apparatus, wheels for supporting the object to be transported, axles on which said wheels are mounted, cranks on said axles, connecting-rods, said wheels having segmental treads at opposite portions of their peripheries, longitudinally - movable track-sections adapted to be engaged alternately by said treads, mechanism for advancing the free set of track-sections, and mechanism for driving said cranks, substantially as set forth.

8. In transporting apparatus, wheels for supporting the object to be transported, longitudinally-movable track-sections, means for supporting and driving said wheels on one set of said track-sections, and mechanism for advancing the other set, alternately, a yoke depending from the truck, horizontal rollers journaled in said yoke and adapted to engage projections on said track-sections, said rollers being vertically movable in their bearings, and means for lifting same, substantially as set forth.

In testimony whereof I, the said WALTER R. DIEHL, have hereunto set my hand.

WALTER R. DIEHL.

Witnesses:
  ROBT. D. TOTTEN,
  JAMES G. MONTGOMERY.